US007688317B2

(12) United States Patent
Berger

(10) Patent No.: US 7,688,317 B2
(45) Date of Patent: Mar. 30, 2010

(54) TEXTURE MAPPING 2-D TEXT PROPERTIES TO 3-D TEXT

(75) Inventor: Damien N. Berger, Enumclaw, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/441,674

(22) Filed: May 25, 2006

(65) Prior Publication Data

US 2007/0273706 A1    Nov. 29, 2007

(51) Int. Cl.
*G06T 15/00* (2006.01)
(52) U.S. Cl. ............ 345/419; 345/582; 345/586; 345/588
(58) Field of Classification Search .......... 345/419, 345/582–588
See application file for complete search history.

(56) References Cited

U.S. PATENT DOCUMENTS

| 6,362,817 B1 * | 3/2002 | Powers et al. ............... 345/419 |
| 6,677,944 B1 * | 1/2004 | Yamamoto ................... 345/422 |
| 6,825,838 B2 | 11/2004 | Smith et al. ................. 345/419 |
| 6,978,230 B1 | 12/2005 | Klosowski et al. ............. 703/7 |
| 2003/0084445 A1 | 5/2003 | Pilat ............................ 725/44 |
| 2004/0227766 A1 | 11/2004 | Chou et al. .................. 345/582 |
| 2005/0285872 A1 | 12/2005 | Wang et al. .................. 345/582 |
| 2006/0017730 A1 | 1/2006 | Meinds ........................ 345/427 |
| 2006/0017741 A1 | 1/2006 | Sekine et al. ................ 345/582 |

OTHER PUBLICATIONS

Stabaugh et al., A Contour-Based Approach to 3D Text Labeling on Triangulated Surfaces; IEEE, Jun. 13-16, 2005, pp. 416-423.*
Qin et al., Real-Time Texture Mapped Vector Glyphs, ACM, Mar. 2006, pp. 125-132.*
DeBry et al., Paiting and Rendering Textures on Unparameterized Models (figure 10), ACM, 2002, pp. 763-768.*
Lucio, M.; "*Modeling Basics: 3D Text*"; NewTeck.com; 2005; 3 Pgs.
Adobe/Macromedia; "*Basics of Director 3D—3DText2*"; Macromedia.com; 2006; 4 Pgs.
Petersharpe.com; "*3D Text*"; http://www.petersharpe.com/Tutorial10.htm; Mar. 9, 2006; 4 Pgs.

* cited by examiner

*Primary Examiner*—Phu K Nguyen
(74) *Attorney, Agent, or Firm*—Merchant & Gould, P.C.

(57) ABSTRACT

Three-dimensional text is displayed without losing its related two-dimensional text properties. The two-dimensional text properties are captured and mapped to the three-dimensional text. Capturing the properties helps preserve the look of the two-dimensional text when it is converted and displayed as three-dimensional text. A texture map is used to capture the two-dimensional properties that are associated with the text. The texture map capturing the two-dimensional text properties is applied to the three-dimensional text and then displayed.

20 Claims, 3 Drawing Sheets

TEXTURE MAPPING 2-D TEXT PROPERTIES TO 3-D TEXT

BACKGROUND

Many applications allow users to create three-dimensional text. When a three-dimensional (3-D) model of text is created, however, many of the two-dimensional properties may be lost in the transition. Applying properties to the resulting 3-D model of the text is either not allowed by the applications or is a very difficult task. For example, if a user wants to apply different colors to the three-dimensional model they are usually left with complicated operations to change the colors of every triangle that make up the model. Some applications may not even provide the ability to change the colors of the 3-D model.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Three-dimensional text is created and displayed without losing the look of its associated two-dimensional text properties. The two-dimensional text properties are captured and mapped to the three-dimensional text. Capturing the text properties helps preserve the look of the three-dimensional text when it is converted and displayed as three-dimensional text. In this way, the conversion between a two-dimensional representation of the text and a three-dimensional representation of the text is more seamless. A texture map may be used to capture the two-dimensional properties and may be used to capture properties such as: text color, shape color, fill patterns; and the like. The texture map capturing the two-dimensional text properties may then be mapped to the three-dimensional model and displayed.

DETAILED DESCRIPTION

Figure 1:
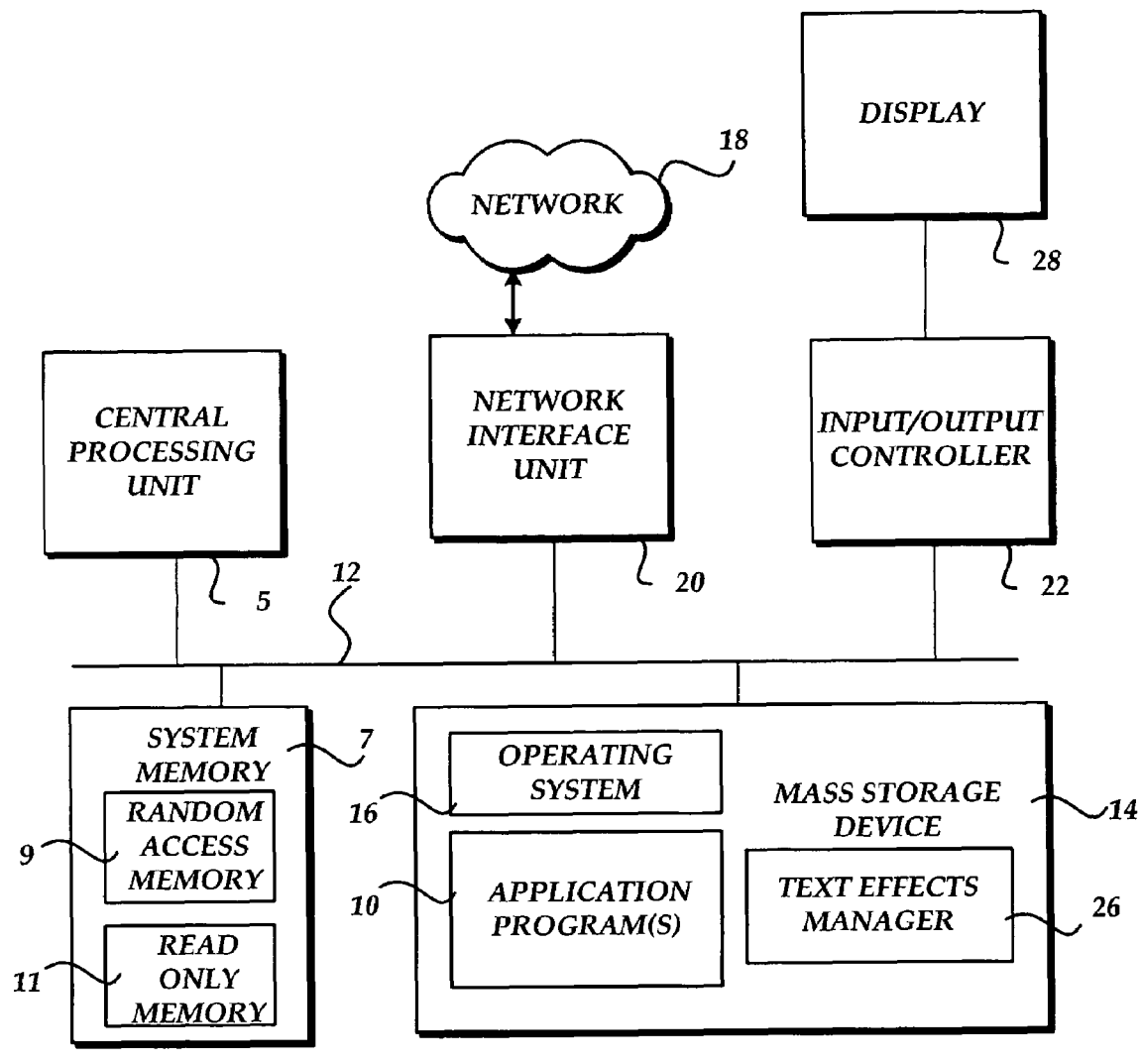
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store one or more application programs 10. The application program(s) 10 is operative to create/interact with three-dimensional text. For example, the application 10 may be configured to create a three-dimensional model from two-dimensional text. Many different three-dimensional effects may also be applied to the two-dimensional text; including, but not limited to: bevels, extrusions, lighting, materials, orientation, and the like. Additionally, three-dimensional effects may also be applied to a shape that is associated with the text. Two-dimensional (2-D) effects may also have been applied to the text such as scaling, warping, shadows and the like. Different 2-D text properties such as shading, coloring and the like, may also be associated with the two-dimensional text. According to one embodiment, the application program(s) 10 comprises the MICROSOFT OFFICE suite of application programs from MICROSOFT CORPORATION. For example, application program 10 may be MICROSOFT WORD, POWERPOINT, EXCEL, ACCESS, PUBLISHER, OUTLOOK and the like. Other application programs that create three-dimensional text from a two-dimensional representation of text may also be utilized. For instance, desktop publishing programs, presentation programs, and any other type of program that allows 3-D text to be created may be utilized.

The application program 10 may utilize a text effects manager 26. Although text effects manager 26 is shown separately from application program 10, it may be included within application program 10 or at some other location. For example, the text effects manager 26 may be included in a graphics pipeline (See element 220 in FIG. 2), the operating system 16, and the like. As will be described in greater detail below, the text effects manager 26 facilitates mapping the two-dimensional text properties to the three-dimensional text. A texture map is created from the two-dimensional text and is mapped to the resulting three-dimensional model of the text. Generally, texture mapping applies a pattern of color to the three-dimensional model of the text such that the 2-D text properties are displayed on the model when it is rendered. The operation of text effects manager 26 will be described in more detail below.

Figure 2:
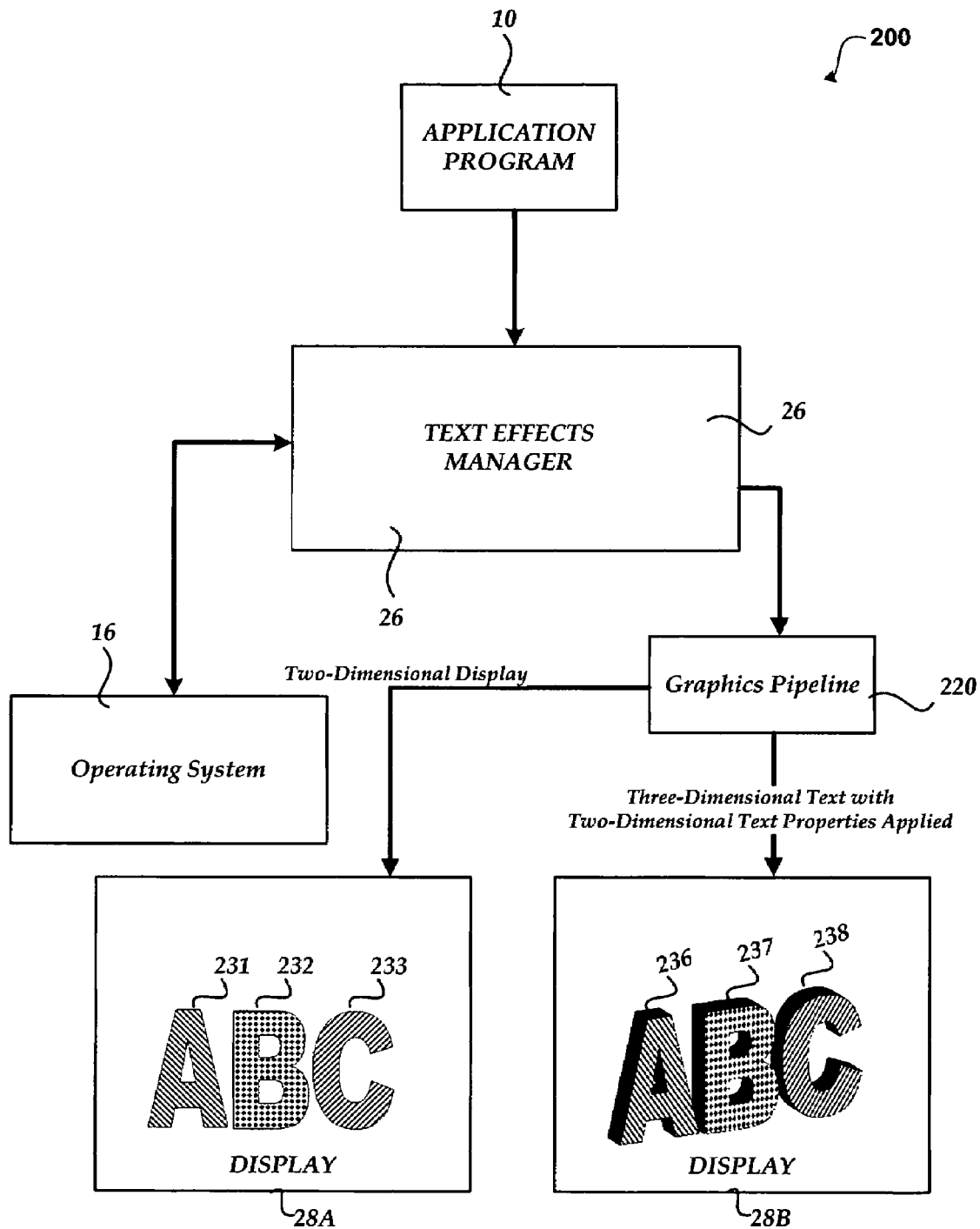
FIG. 2 shows a mapping system for mapping two-dimensional text properties to three-dimensional text.

FIG. 2 shows a mapping system 200 for mapping two-dimensional text properties to three-dimensional text. As illustrated, mapping system 200 includes application program 10, text effects manager 26, operating system 16, graphics pipeline 220, and display 28A and 28B.

As described briefly above, the text effects manager 26 maps two-dimensional text properties to the three-dimensional model of the text. The two-dimensional text properties associated with the text from which the three-dimensional model created include properties such as: fill patterns; coloring; shading; and the like.

As illustrated in display 28A, the two-dimensional text includes the letters A (231); B (232) and C (233). Each letter may have the same two-dimensional text properties applied to it or each letter may have a different combination of two-dimensional text properties applied to it. In the present example, each letter has different two-dimensional text properties applied to it as represented by the different fill patterns surrounding the letters. For instance, each letter may be colored differently (e.g. A (231) could be red; B (232) could be green; and C (233) could be blue). Each letter could also have a fill pattern associated with it.

According to one embodiment, the two-dimensional text properties that are associated with each of the two-dimensional letters are captured in a texture map which is then mapped to the three-dimensional model. In other words, a picture is created that captures the properties (e.g. coloring; shading; fill patterns) of the two-dimensional text. For example, if the two-dimensional text that is displayed within display 28A is colored a particular way then the three-dimensional representation of the text (display 28B) also displays the particular coloring scheme when rendered. Capturing the properties in the texture map helps preserve the look of the text when presented as a three-dimensional model. In this way, the conversion between a two-dimensional representation and a three-dimensional model is more seamless. One or more texture maps may be used to capture the two-dimensional text properties. For example, a texture map could be created for the entire text run; a texture map could be created for each character; a texture map could be created for each different set of two-dimensional text properties; and the like.

As illustrated in system 200, application program 10 is configured to send information relating to the text that is displayed within display 28A to text effects manager 26 such that it may create three-dimensional text having the two-dimensional text shape properties mapped to it. In the present example, the information may include the text information for the text run "ABC" and its associated two-dimensional text properties such as the shading, coloring, fill properties, and the like.

In the example illustrated, display 28B shows a three-dimensional view for the text run "ABC" that is associated with the two-dimensional text run "ABC" illustrated in display 28A. Referring to the three-dimensional representation of the text that is displayed within display 28B it can be seen that the text run "ABC" is extruded to depth, then rotated at an angle away from the viewer. Each letter in the text run (A (236), B (237) and C (238)) has the two-dimensional text properties mapped to it that were created from the two-dimensional text run illustrated in display 28A. While the two-dimensional text and the three-dimensional text illustrated has one set of effects applied, any type of two-dimensional and three-dimensional effects may be applied to the text and/or shape. The text may be one or more characters. For example, a text run may be a few characters, a word, a sentence, and the like.

In this example, the application program 10 has provided text effects manager 26 the text information such that the graphics pipeline 220 may properly render the three-dimensional text illustrated in display 28B with a texture map of the two-dimensional text properties for the text in display 28A applied to the three-dimensional model of the text.

When a three-dimensional model of the two-dimensional text is created, the text effects manager 26 applies the texture map to the three-dimensional model. This is in contrast to having to change the properties for each triangle comprising the three-dimensional model, as many other programs require.

The three-dimensional model may be generated many different ways. For example, the model may be generated extruding the font and then applying a bevel. The resulting 3-D model is represented by a set of triangles. Color information that was associated with the two-dimensional model is not generally maintained when the three-dimensional model is generated. In other words, there is no remaining knowledge of which color should be applied to which triangle.

As discussed above, in order to maintain the color information, a texture map of the original 2-D text with colors is created. The resolution of the texture map may be determined many different ways. For example, the resolution may be based on the system's computing capabilities; the resolution of the three-dimensional model; and the like. After creating the three-dimensional model that is associated with the text, the texture map that was created from the two-dimensional text is mapped to the three-dimensional model. Mapping/Applying the texture map to the three-dimensional model generally superimposes the texture map over the resulting 3-D model of the text. The result to the user is that it looks like 2-D properties (i.e. character level coloring) are applied to the three-dimensional model. According to one embodiment, a dilation algorithm is used to help ensure there are no holes in the appearance of the 3-D model. For example, the texture map may be at a much lower resolution and when applied to the three-dimensional model it may contain anti-aliasing artifacts. If the low resolution texture map is mapped straight onto the 3-D model then there may be holes in the resulting image a user sees. In order to avoid that, the three-dimensional model's edges and curves are determined and then the texture map is dilated by some amount to ensure it fills the entire 3-D model.

Figure 3:
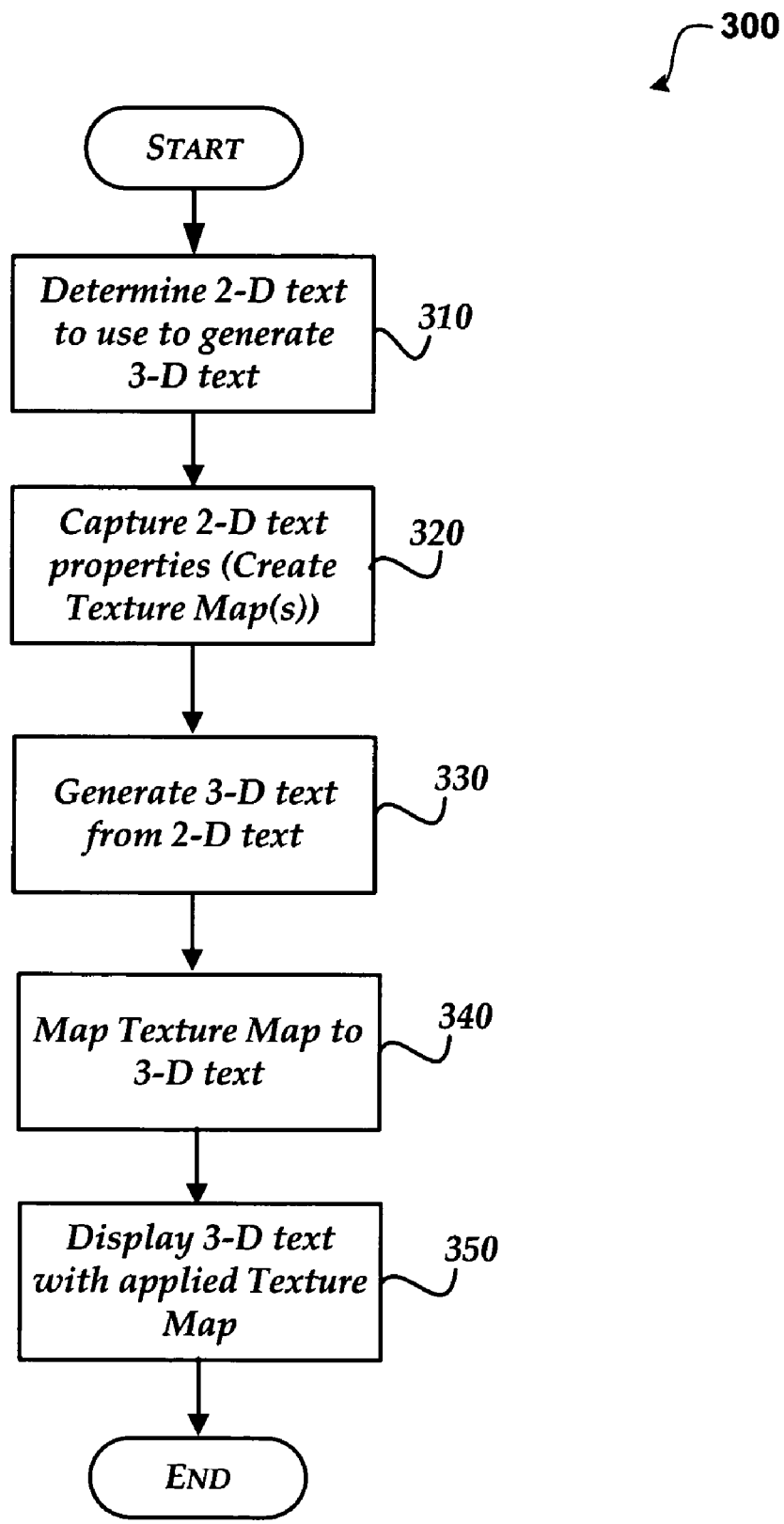
FIG. 3 illustrates a process for mapping two-dimensional text properties to three-dimensional text.

Referring now to FIG. 3, an illustrative process for mapping two-dimensional text properties to three-dimensional text will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310 where the two-dimensional text that is used to generate the three-dimensional text is determined. Generally, the three-dimensional text may be created from any text run. For example, a user may select a portion of two-dimensional text from within a document to create the three-dimensional text. A user may also create the two-dimensional text run.

Moving to operation 320, one or more texture maps are created from the two-dimensional text. As discussed above, the texture map(s) captures the look of the two-dimensional text properties for the text. Capturing the properties in the texture map helps preserve the look of the text when presented as a three-dimensional model. According to one embodiment, a single texture map is created for the entire text run determined at operation 310.

Flowing to operation 330, the three-dimensional text is generated from the two-dimensional text. As discussed above, a model of the three-dimensional text may be created many different ways. For example, the model may be generated by extruding the font and then applying a bevel.

Transitioning to operation 340, the texture map is applied to the three-dimensional model of the text. When there is more than one texture map, then each texture map is applied to its respective portion on the three-dimensional model. Mapping/Applying the texture map to the three-dimensional text model generally superimposes the texture map over the resulting 3-D model of the text. The result to the user is that it looks like 2-D properties (i.e. character level coloring) are applied to the three-dimensional model.

When the texture map has been applied to the three-dimensional text, the process flows to operation 350 where the three-dimensional text is displayed with its two-dimensional properties mapped on the model.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for mapping two-dimensional text properties to a three-dimensional model of two-dimensional text, comprising:
    capturing two-dimensional text properties from two-dimensional text by creating a picture having a defined resolution of the two-dimensional text; wherein the picture is a single two-dimensional picture of the two-dimensional text that captures a look of text properties of the two-dimensional text; and
    applying the picture to the three-dimensional model of the two-dimensional text by superimposing the two-dimensional picture over the three-dimensional model such that each character of the three-dimensional model of the two-dimensional text is associated with the picture of each associated character within the picture that shows the captured two-dimensional text properties on the three-dimensional model when displayed.

2. The method of claim 1, wherein capturing the two-dimensional text properties from two-dimensional text comprises creating a separate single picture for each character in the two-dimensional text.

3. The method of claim 2, wherein creating the picture comprises creating a separate picture for each character in the two-dimensional text that has different text properties.

4. The method of claim 2, further comprising applying the picture to a model representing the three-dimensional text.

5. The method of claim 4, further comprising examining the model and applying a dilation algorithm to the picture.

6. The method of claim 4, further comprising displaying the model with the applied picture.

7. The method of claim 2, wherein the two-dimensional text is used in creating a model to represent the two-dimensional text three-dimensionally.

8. The method of claim 1, wherein capturing the two-dimensional text properties includes capturing a property from: a color; a shading; and a fill pattern associated with the two-dimensional text.

9. A computer-readable storage medium having computer-executable instructions for editing three-dimensional text when executed on a computing device, the instructions comprising:
    determining two-dimensional text to represent as a three-dimensional model;
    capturing two-dimensional text properties from the two-dimensional text by creating at least one picture of the two-dimensional text; wherein the picture is a two-dimensional picture of each character of the two-dimensional text that captures a look of text properties of the two-dimensional text; and
    applying the at least one picture to the three-dimensional model such that each character of the three-dimensional text is associated with the picture of each associated character within the at least one picture.

10. The computer-readable medium of claim 9, wherein capturing the two-dimensional text properties comprises creating a picture using a representation of the two-dimensional text.

11. The computer-readable medium of claim 10, wherein creating the texture map comprises creating a different picture for each distinct set of text properties for the two-dimensional text.

12. The computer-readable medium of claim 10, further comprising applying the picture to the three-dimensional model and displaying the three-dimensional model with the applied picture.

13. The computer-readable medium of claim 9, wherein capturing the two-dimensional text properties comprise capturing coloring, shading, and fill patterns associated with the two-dimensional text.

14. A system for mapping two-dimensional text properties to three-dimensional text, comprising:
   a processor and a computer-readable medium;
   an operating environment stored on the computer-readable medium and executing on the processor;
   a display;
   an application operating under the control of the operating environment and operative to display text having three-dimensional properties; and
   a text effects manager that is configured to:
      capture two-dimensional text properties from two-dimensional text by creating a picture of the two-dimensional text; wherein the picture is a two-dimensional picture of each character of the two-dimensional text that captures a look of text properties of the two-dimensional text; and
      apply the picture to a three-dimensional model of the three-dimensional text such that each character of the three-dimensional text is associated with the picture of each associated character within the at least one picture and that when the model is displayed by the application the three-dimensional text shows the captured two-dimensional text properties displayed as the picture that is applied to the three-dimensional model.

15. The system of claim 14, wherein creating the picture comprises creating a different picture for each character included in the two-dimensional text.

16. The system of claim 15, wherein creating the picture comprises creating a picture for each independent model that is used in representing the three-dimensional text.

17. The system of claim 14, wherein the text effects manager is further configured to apply a dilation algorithm to the picture.

18. The system of claim 15, wherein the two-dimensional text is used in creating the three-dimensional model.

19. The system of claim 15, wherein creating the picture comprises determining a resolution for the picture based on available resources of the system.

20. The system of claim 14, wherein the picture captures at least coloring and shading from the two-dimensional text.

* * * * *